(12) United States Patent
Masunaga

(10) Patent No.: US 11,928,533 B2
(45) Date of Patent: Mar. 12, 2024

(54) CONVEYING DEVICE, IMAGE FORMING APPARATUS, CONVEYING METHOD, AND NON-TRANSITORY RECORDING MEDIUM

(71) Applicant: Suguru Masunaga, Kanagawa (JP)

(72) Inventor: Suguru Masunaga, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/310,850

(22) Filed: May 2, 2023

(65) Prior Publication Data

US 2023/0385583 A1    Nov. 30, 2023

(30) Foreign Application Priority Data

May 25, 2022  (JP) ................. 2022-085494

(51) Int. Cl.
| | |
|---|---|
| *G06K 15/00* | (2006.01) |
| *B41J 13/00* | (2006.01) |
| *G06K 15/02* | (2006.01) |
| *G06K 15/16* | (2006.01) |

(52) U.S. Cl.
CPC .......... *G06K 15/16* (2013.01); *B41J 13/0009* (2013.01); *G06K 15/022* (2013.01); *G06K 15/408* (2013.01); *G06K 2215/101* (2013.01)

(58) Field of Classification Search
CPC .... G06K 15/16; G06K 15/022; G06K 15/408; G06K 2215/101; B41J 13/0009
See application file for complete search history.

(56) References Cited

U.S. PATENT DOCUMENTS

| | | | |
|---|---|---|---|
| 2012/0050438 A1* | 3/2012 | Wada ................. | B65H 23/1955 242/412.1 |
| 2013/0042807 A1* | 2/2013 | Noguchi ................ | B65H 18/10 118/500 |
| 2013/0235129 A1 | 9/2013 | Masunaga | |
| 2014/0132671 A1 | 5/2014 | Masunaga | |
| 2015/0258822 A1 | 9/2015 | Masunaga | |
| 2016/0121626 A1 | 5/2016 | Masunaga et al. | |

(Continued)

FOREIGN PATENT DOCUMENTS

| | | |
|---|---|---|
| JP | 2012-046307 | 3/2012 |
| JP | 2013-154529 | 8/2013 |

(Continued)

*Primary Examiner* — Huo Long Chen
(74) *Attorney, Agent, or Firm* — IPUSA, PLLC

(57) ABSTRACT

A conveying device includes a sheet feeder that feeds a recording medium unreeled from a roll, a conveying roller that conveys the recording medium, and circuitry. The circuitry is to obtain a plurality of actual conveyance amounts each of which is a conveyance amount of the recording medium actually conveyed by the conveying roller at a time, calculate an adjustment value based on a difference between a target conveyance amount and each of the plurality of actual conveyance amounts to obtain a plurality of adjustment values, calculate an approximate line based on a plurality of adjustment points in a two-dimensional coordinate plane determined by the adjustment value and a diameter of the roll, specify an adjustment value corresponding to a current diameter of the roll based on the approximate line, and correct, based on the specified adjustment value, a conveyance amount by which the conveying roller conveys the recording medium.

12 Claims, 9 Drawing Sheets

(56) References Cited

U.S. PATENT DOCUMENTS

| | | |
|---|---|---|
| 2017/0151815 A1 | 6/2017 | Masunaga |
| 2017/0368849 A1 | 12/2017 | Masunaga |
| 2019/0283469 A1* | 9/2019 | Fujii ................... H04N 1/6044 |
| 2020/0039250 A1 | 2/2020 | Kizaki et al. |
| 2020/0262221 A1 | 8/2020 | Yokozawa et al. |
| 2021/0155435 A1 | 5/2021 | Masunaga |
| 2022/0088947 A1 | 3/2022 | Yokozawa et al. |
| 2022/0169476 A1* | 6/2022 | Masunaga ................ B41J 29/02 |

FOREIGN PATENT DOCUMENTS

| | | |
|---|---|---|
| JP | 2020-049915 | 4/2020 |
| JP | 2020-131701 | 8/2020 |
| WO | WO2014/119031 A1 | 8/2014 |

* cited by examiner

CONVEYING DEVICE, IMAGE FORMING APPARATUS, CONVEYING METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2022-085494, filed on May 25, 2022, in the Japan Patent Office, the entire disclosure of which is hereby incorporated by reference herein.

BACKGROUND

Technical Field

The present disclosure relates to a conveying device, an image forming apparatus, a conveying method, and a non-transitory recording medium.

Related Art

There are already known a conveying device and an image forming apparatus in which back tension is applied to a roll medium (a continuous medium wound in a roll) and a portion unreeled from the roll is conveyed to a printing device with a conveying roller for printing.

As a technique for conveying such a roll medium, there is disclosed a printer equipped with a platen, a reel shaft, a tension bar, a support arm, a support shaft, and a spring. In the printer, the center of the support shaft is positioned inside the contour of the reel shaft as viewed in an axial direction of the support shaft. The platen supports a sheet-shaped recording medium that is conveyed forward during printing. The reel shaft takes up the recording medium after printing. The tension bar applies tension to the recording medium by pressing a portion of the recording medium between the platen and the reel shaft. The support arm supports the tension bar. The support shaft supports the support arm so that the support arm can swing. The spring applies a force in a direction to swing upward to the support arm.

SUMMARY

In one aspect, a conveying device includes a sheet feeder that feeds a recording medium unreeled from a roll, a conveying roller that conveys the recording medium, and circuitry. The circuitry is to obtain a plurality of actual conveyance amounts each of which is a conveyance amount of the recording medium actually conveyed by the conveying roller at a time, calculate an adjustment value based on a difference between a target conveyance amount and each of the plurality of actual conveyance amounts to obtain a plurality of adjustment values, calculate an approximate line based on a plurality of adjustment points in a two-dimensional coordinate plane determined by the adjustment value and a diameter of the roll, specify an adjustment value corresponding to a current diameter of the roll based on the approximate line, and correct, based on the specified adjustment value, a conveyance amount by which the conveying roller conveys the recording medium. Each of the plurality of adjustment points is determined by a diameter of the roll at a time the recording medium is conveyed and the adjustment value calculated from the actual conveyance amount obtained at the time the recording medium is conveyed.

In another aspect, an image forming apparatus includes the conveying device of the one aspect and a printing device that prints an image on the recording medium.

In another aspect, a conveying method includes obtaining a plurality of actual conveyance amounts each of which is a conveyance amount of a recording medium actually conveyed by a conveying roller at a time, calculating an adjustment value based on a difference between a target conveyance amount and each of the plurality of actual conveyance amounts to obtain a plurality of adjustment values, calculating an approximate line based on a plurality of adjustment points in a two-dimensional coordinate plane determined by the adjustment value and a diameter of the roll, specifying an adjustment value corresponding to a current diameter of the roll based on the approximate line, and correcting, based on the specified adjustment value, a conveyance amount by which the conveying roller conveys the recording medium. Each of the plurality of adjustment points is determined by a diameter of the roll at a time the recording medium is conveyed and the adjustment value calculated from the actual conveyance amount obtained at the time the recording medium is conveyed.

In another aspect, a non-transitory recording medium carrying computer readable codes for controlling a computer system to perform a method. The method includes obtaining a plurality of actual conveyance amounts each of which is a conveyance amount of a recording medium actually conveyed by a conveying roller at a time, calculating an adjustment value based on a difference between a target conveyance amount and each of the plurality of actual conveyance amounts to obtain a plurality of adjustment values, calculating an approximate line based on a plurality of adjustment points in a two-dimensional coordinate plane determined by the adjustment value and a diameter of the roll, specifying an adjustment value corresponding to a current diameter of the roll based on the approximate line, and correcting, based on the specified adjustment value, a conveyance amount by which the conveying roller conveys the recording medium. Each of the plurality of adjustment points is determined by a diameter of the roll at a time the recording medium is conveyed and the adjustment value calculated from the actual conveyance amount obtained at the time the recording medium is conveyed.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
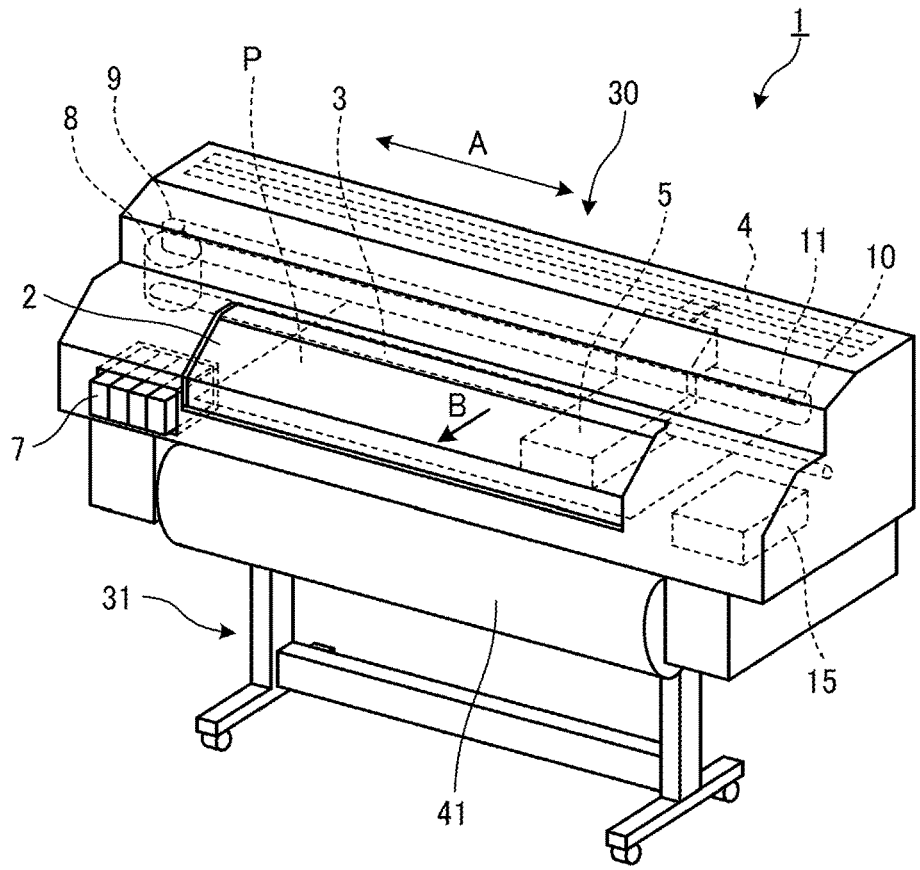
FIG. 1 is a perspective view of an outer appearance of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, descriptions are given in detail of a conveying device, an image forming apparatus, a conveying method, and a non-transitory recording medium according to an embodiment of the present disclosure with reference to the drawings. The present disclosure, however, is not limited to the following one or more embodiments, and the constituent elements of the following one or more embodiments include elements that may be easily conceived by those skilled in the art, those being substantially the same ones, and those being within equivalent ranges. Furthermore, various omissions, substitutions, changes, and combinations of the constituent elements may be made without departing from the gist of the following one or more embodiments.

In this disclosure, computer software (hereinafter simply referred to as "software") is a program relating to operations to be performed by a computer or any data to be used in processing by a computer according to such a program. Application software (hereinafter simply referred to as an "application") is a general term for any software used to perform certain processing. An operating system (hereinafter simply referred to as an "OS") is software for controlling a computer, such that software, such as an application, is able to use computer resources. The OS controls basic operations of the computer, such as input and output of data, management of hardware resources such as a memory and a hard disk, and processes to be performed. The application operates by utilizing functions provided by the OS. The program is a set of instructions for causing the computer to perform processing to have a certain result. Data or an instruction that is not a direct command to a computer is not a program itself. However, data that defines processing to be performed by the program is interpreted as equivalent to the program. For example, a data structure, which is a logical structure of data described by an interrelation between data elements, may be interpreted as equivalent to the program.

Overall Configuration of Image Forming Apparatus

Figure 2:
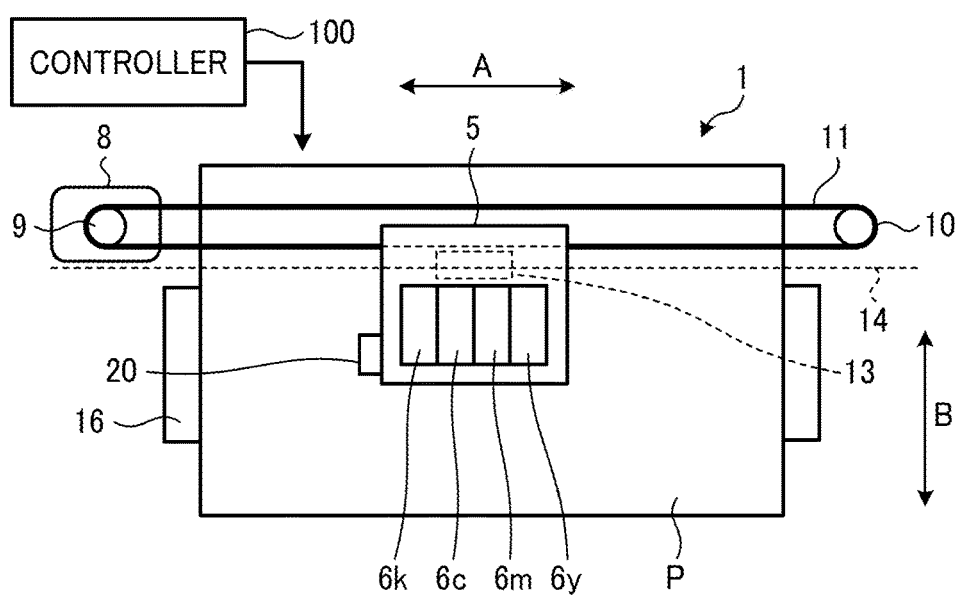
FIG. 2 is a schematic diagram illustrating an example of a main configuration of the image forming apparatus according to an embodiment of the present disclosure.
Figure 3:
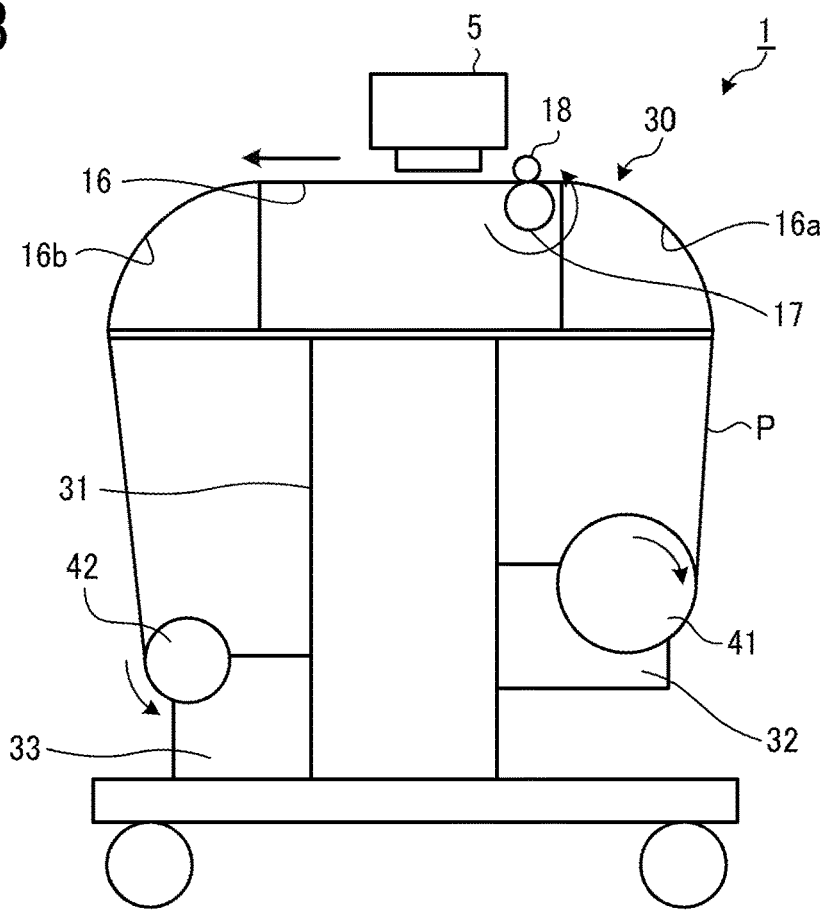
FIG. 3 is a cross-sectional side view of the image forming apparatus according to an embodiment of the present disclosure.

FIG. 1 is a perspective view of an outer appearance of an image forming apparatus according to the present embodiment. FIG. 2 is a schematic diagram illustrating an example of a main configuration of the image forming apparatus according to the present embodiment. FIG. 3 is a cross-sectional side view of the image forming apparatus according to the present embodiment. With reference to FIGS. 1 to 3, an overall configuration of an image forming apparatus 1 according to the present embodiment is described.

The image forming apparatus 1 according to the present embodiment is a wide serial-type inkjet recording apparatus. As illustrated in FIGS. 1 and 2, the image forming apparatus 1 includes a body 30, a support stand 31 for supporting the body 30, and a controller 100.

As illustrated in FIGS. 1 and 2, the body 30 includes a cover 2, a guide rod 3, an auxiliary guide rail 4, a carriage 5, recording heads (printing devices) 6k, 6c, 6m, and 6y, a cartridge holder 7, a main scanning motor 8, a driving pulley 9, a pressure pulley 10, a timing belt 11, an encoder 13, an encoder sheet 14, a maintenance mechanism 15, a platen 16, an end detection sensor 20, and a roll medium 41.

The cover 2 is a cover that shields from the outside an image forming portion where the carriage 5 scans. The guide rod 3 and the auxiliary guide rail 4 are guide members that are bridged between two side plates of the body 30 and slidably hold the carriage 5 in the main scanning direction (direction A illustrated in FIGS. 1 and 2).

The carriage 5 is a member that is moved in the main scanning direction by a main scanning mechanism. Specifically, the carriage 5 is moved in the main scanning direction via the timing belt 11 rotationally driven by the main scanning motor 8. In the carriage 5, a sub tank for supplying ink of respective colors to the recording heads 6*k*, 6*c*, 6*m*, and 6*y* illustrated in FIG. 2 is mounted.

The recording heads 6*k*, 6*c*, 6*m*, and 6*y* are liquid discharge heads that are mounted in the carriage 5. The recording heads 6*k*, 6*c*, 6*m*, and 6*y* discharge, according to ink cartridges set in the cartridge holder 7, for example, ink of respective colors such as black (K), cyan (C), magenta (M), and yellow (Y) from nozzle rows toward a recording medium P. Note that the recording heads 6*k*, 6*c*, 6*m*, and 6*y* are collectively referred to as "recording heads 6," and one thereof is referred to as a "recording head 6." Each of the recording heads 6 has a plurality of nozzle rows arranged in the sub-scanning direction (direction B illustrated in FIGS. 1 and 2). In the present embodiment, the sub-scanning direction is a direction (direction B illustrated in FIGS. 1 and 2) in which the recording medium P fed from the roll medium 41 is conveyed, and is orthogonal to the main scanning direction. Each of the recording heads 6 is mounted in the carriage 5 so that the direction in which ink is discharged from the plurality of nozzle rows is downward (the direction toward the recording medium P).

The cartridge holder 7 is a holder in which ink cartridges of respective colors are detachably mounted. The inks filled in the ink cartridges are supplied to sub-tanks of the carriage 5 by a supply pump through supply tubes of the respective colors.

The main scanning motor 8 is a motor that is disposed on one side in the main scanning direction and drives the timing belt 11 to move rotationally via the driving pulley 9. The timing belt 11 is bridged between the driving pulley 9 and the pressure pulley 10. The driving pulley 9 is a pulley that is rotationally driven by the main scanning motor 8. The pressure pulley 10 is disposed on the side opposite to the main scanning motor 8 (the driving pulley 9) in the main scanning direction. The pressure pulley 10 is tensioned outward (in a direction away from the driving pulley 9) by a tension spring. The timing belt 11 is a traction member that is rotationally moved by the rotational drive of the main scanning motor 8.

The encoder 13 is a sensor that is mounted in the carriage 5 and detects a position of the carriage 5 in the main scanning direction by continuously reading the encoder sheet 14 bridged between the two side plates of the body 30. The encoder sheet 14 is a sheet that is bridged between the two side plates of the body 30 and has slits or the like that can be read by the encoder 13.

The maintenance mechanism 15 is a mechanism that is disposed in a non-printing area on one side in the main scanning direction of the carriage 5, and maintains and restores conditions of the recording heads 6. The maintenance mechanism 15 includes caps for capping respective nozzle surfaces of the recording heads 6 and a wiper for wiping the nozzle surfaces. A replaceable waste liquid tank that stores waste liquid generated by the maintenance and restoring operation is disposed below the maintenance mechanism 15.

The platen 16 is a member that sucks and supports the recording medium P fed from the roll medium 41.

The end detection sensor 20 is a sensor that detects an end of the recording medium P that is fed from the roll medium 41 and conveyed on the platen 16. Based on a position of the end of the recording medium P detected by the end detection sensor 20, a state where the recording medium P is skewed is detected.

The roll medium 41 is a continuous medium wound in a roll and a portion unreeled from the roll is fed toward the body 30 as the recording medium P in a state where torque is applied by a sheet feed driving device 32 (described later) disposed in the support stand 31.

The controller 100 is a controller that controls operations of the image forming apparatus 1.

Further, as illustrated in FIG. 3, the image forming apparatus 1 includes the sheet feed driving device 32 (a sheet feeder), a pre-guide plate 16*a*, a conveying roller 17, a pinch roller 18, a post-guide plate 16*b*, a take-up driving device 33, and a take-up sheet tube 42.

The sheet feed driving device 32 is a driving mechanism that feeds the roll medium 41 toward the body 30 as the recording medium P by driving the roll medium 41 to rotate. The sheet feed driving device 32 is driven by a motor and rotates in a direction to eliminate slack while applying a constant torque to the roll medium 41 with a torque limiter or the like.

The pre-guide plate 16*a* is a plate member that is disposed upstream from the platen 16 in the conveying direction of the recording medium P and forms a conveyance path for the recording medium P.

The conveying roller 17 is a roller that intermittently conveys the recording medium P in the sub-scanning direction on the platen 16. The pinch roller 18 is a roller that nips the recording medium P between the conveying roller 17 and the pinch roller 18.

The post-guide plate 16*b* is a plate member that is disposed downstream from the platen 16 in the conveying direction of the recording medium P and forms a conveyance path for the recording medium P. The post-guide plate 16*b* has a shape such that the recording medium P to be conveyed is guided to the take-up sheet tube 42.

The take-up driving device 33 is a driving mechanism that supports the take-up sheet tube 42 and takes up the recording medium P by driving the take-up sheet tube 42 to rotate. The take-up driving device 33 is driven by a motor and rotates in a direction to eliminate slack while applying a constant torque to the roll medium 41 with a torque limiter or the like.

Configuration of Driving Mechanism of Conveying Roller

Figure 4:
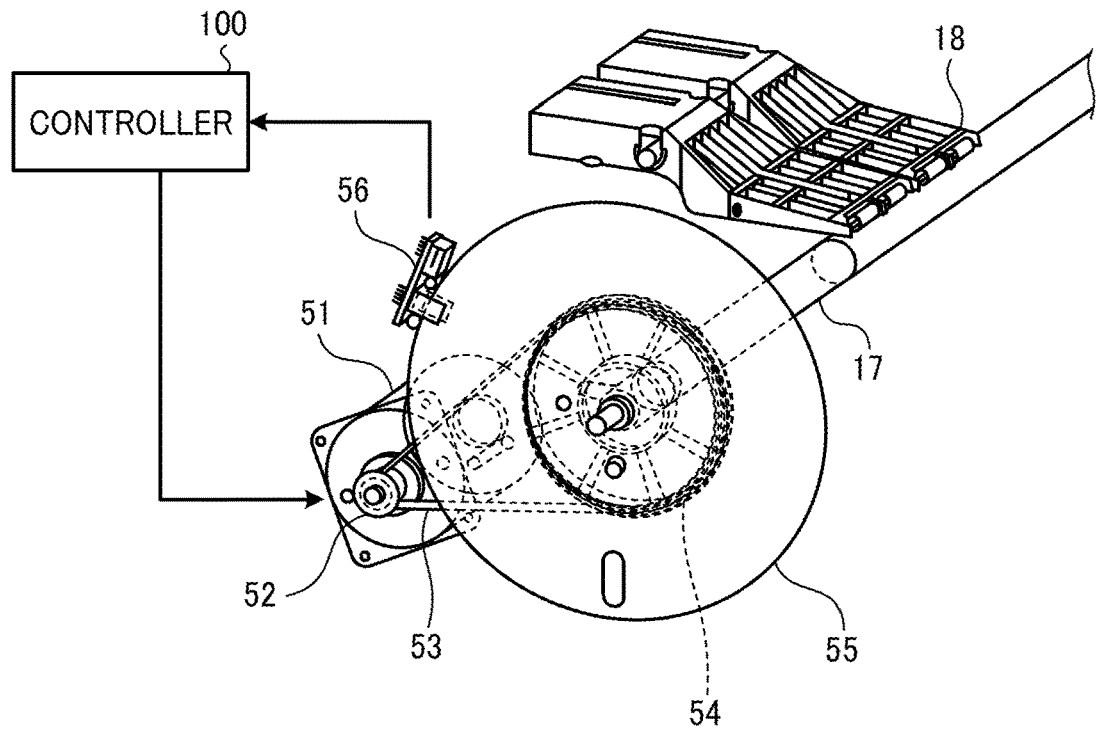
FIG. 4 is a schematic diagram illustrating an example of a configuration of a driving mechanism of a conveying roller of the image forming apparatus according to an embodiment of the present disclosure.

FIG. 4 is a schematic diagram illustrating an example of a configuration of a driving mechanism of a conveying roller of the image forming apparatus according to the present embodiment. With reference to FIG. 4, the configuration of the driving mechanism of the conveying roller 17 of the image forming apparatus 1 according to the present embodiment is described.

As illustrated in FIG. 4, the image forming apparatus 1 includes a driving mechanism for controlling the conveying roller 17 to rotate. The driving mechanism includes a conveying motor 51, a driving pulley 52, a belt 53, a driven pulley 54, an encoder sheet 55, and an encoder 56.

The conveying motor 51 is a motor that drives the belt 53 to move rotationally via the driving pulley 52. The conveying motor 51 is controlled by the controller 100. The belt 53 is bridged between the driving pulley 52 and the driven pulley 54. The driving pulley 52 is a pulley that is rotationally driven by the conveying motor 51. The belt 53 is a traction member that is rotationally moved by the rotational drive of the conveying motor 51. The driven pulley 54 is a pulley that is rotated by the rotational drive of the driving pulley 52. The conveying roller 17 rotates in conjunction with the rotation of the driven pulley 54. Thus, the recording medium P is intermittently conveyed in the sub-scanning direction.

The encoder 56 is a sensor that is disposed at the outer circumference of the encoder sheet 55 having a disc shape and coaxially disposed with the conveying roller 17. The encoder 56 detects a rotational position and a rotational amount of the conveying roller 17 by continuously reading the encoder sheet 55. In other words, a conveyance amount of the recording medium P conveyed by the rotation of the conveying roller 17 is converted into the number of encoder pulses detected by the encoder 56. The information detected by the encoder 56 is input to the controller 100. The encoder sheet 55 is a sheet that has a disc shape, is coaxially disposed with the conveying roller 17, and has slits or the like that can be read by the encoder 56 in a circumferential portion.

As described above, the conveyance amount of the recording medium P is converted into the number of encoder pulses detected by the encoder 56. Regarding the conveyance amount of the recording medium P, in a case where there is a difference (deviation) between an ideal conveyance amount, that is, a conveyance amount to be targeted (hereinafter referred to as a target conveyance amount) and a conveyance amount actually conveyed (hereinafter referred to as an actual conveyance amount), the conveyance amount by which the conveying roller 17 conveys the recording medium P has to be corrected so that the actual conveyance amount approaches the target conveyance amount. In addition, since the deviation of the conveyance amount varies depending on the type of the roll medium, it is necessary to print a test pattern for adjusting the conveyance amount and calculate an adjustment value when the roll medium is replaced. An example of the method for adjusting the conveyance amount is outputting a test pattern that has a first line to be printed with upstream nozzles of a recording head and a second line to be printed with downstream nozzles of the recording head in the sub-scanning direction on a recording medium. The pattern is designed such that the second line is printed after the recording medium is conveyed by a certain amount after the printing of the first line, and the second line overlaps the first line in a case where the conveyance amount is correct. The amount of deviation between the first line and the second line is detected by a sensor for adjustment. Another example of the method for adjusting the conveyance amount is outputting, while the conveyance amount is being changed, a plurality of test patterns that have first lines to be printed with upstream nozzles of a recording head and second lines to be printed with downstream nozzles of the recording head in the sub-scanning direction on a recording medium. The pattern of each of the plurality of test patterns is designed such that the second line is printed after the recording medium is conveyed by a certain amount after the printing of the first line, and the second line overlaps the first line in a case where the conveyance amount is correct. Then, a printed pattern that has no deviation visually between the first line and the second line is selected for adjustment. In a configuration which the torque applied to the roll medium 41 by the sheet feed driving device 32 is constant, as the diameter of the roll medium 41 becomes smaller, the back tension becomes higher. Accordingly, the recording medium P slips on the conveying roller 17, and an actual conveyance amount becomes smaller. For this reason, a positive adjustment of the conveyance amount is required. In other words, even when the conveyance amount is adjusted, the conveyance amount varies as the remaining amount of the roll medium changes.

For this reason, in the present embodiment, the diameter of the roll medium 41 and the adjustment value when the conveyance amount is adjusted are held in a memory, and an approximate line is calculated based on data obtained as a result of a plurality of times of adjustment. By applying the adjustment value changed, based on the approximate line, according to the diameter of the roll medium 41 that changes during printing, a stable conveyance amount is achieved without being affected by the remaining amount of the roll medium 41. Further, in a case where the same type of the roll medium is used as a replacement, the conveyance amount can be corrected by applying an adjustment value specified according to the diameter of the roll medium 41 based on the approximate line without adjusting the conveyance amount again after the replacement. In the present embodiment, the adjustment of the conveyance amount refers to calculating an adjustment value for an individual diameter of the roll medium 41, and furthermore, calculating an approximate line in a case where a plurality of adjustment values is calculated. In addition, the correction of the conveyance amount refers to specifying, based on the approximate line, an adjustment value according to the diameter of the roll medium 41 at the time of conveyance of the recording medium P, adding the specified adjustment value to the target conveyance amount (the ideal conveyance amount), and obtaining the resultant as a conveyance amount (hereinafter sometimes referred to as a corrected conveyance amount) by which the conveying roller 17 is instructed to move the recording medium P.

Hardware Configuration of Image Forming Apparatus

Figure 5:
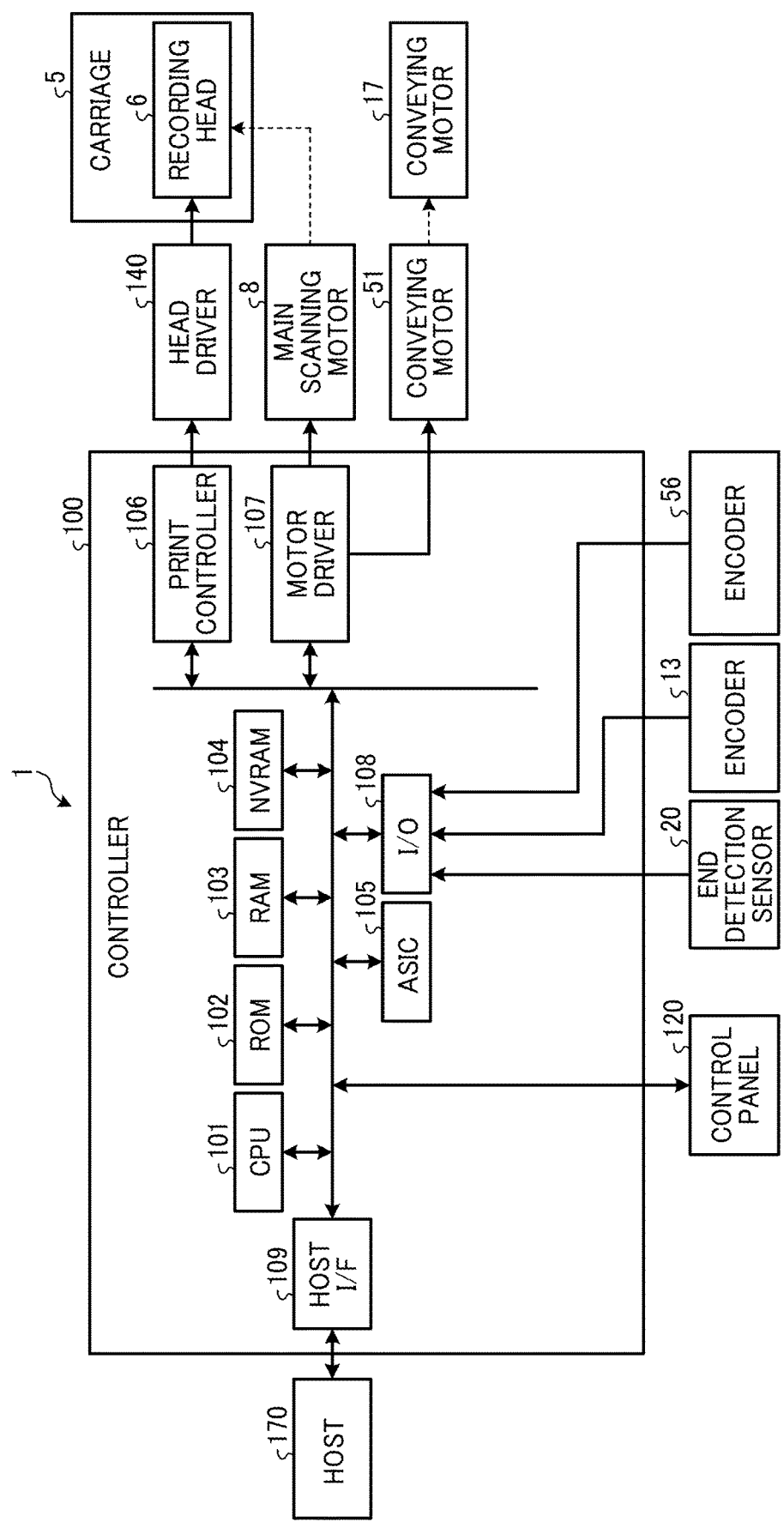
FIG. 5 is a block diagram illustrating an example of a hardware configuration of the image forming apparatus according to an embodiment of the present disclosure.

FIG. 5 is a block diagram illustrating an example of a hardware configuration of the image forming apparatus according to the present embodiment. With reference to FIG. 5, a hardware configuration of the image forming apparatus 1 according to the present embodiment is described.

As illustrated in FIG. 5, the image forming apparatus 1 includes the controller 100, a control panel 120, the end detection sensor 20, the encoder 13, the encoder 56, a head driver 140, the main scanning motor 8, and the conveying motor 51.

The controller 100 includes a central processing unit (CPU) 101, a read only memory (ROM) 102, a random access memory (RAM) 103, a non-volatile random access memory (NVRAM) 104, an application-specific integrated circuit (ASIC) 105, a print controller 106, a motor driver 107, an input and output (I/O) interface 108, and a host interface (I/F) 109.

The CPU 101 is a processor that controls entire operation of the image forming apparatus 1. The ROM 102 is a nonvolatile storage device that stores fixed data such as programs to be executed by the CPU 101. The RAM 103 is a volatile storage device that serves as a work area for arithmetic processing executed by the CPU 101. In addition, the RAM 103 temporarily stores image data and the like.

The NVRAM 104 is a nonvolatile memory that retains data even when the power supply of the image forming apparatus 1 is turned off. The NVRAM 104 stores, for example, data of approximate lines for correcting the conveyance amount to be described later.

The ASIC 105 is an integrated circuit that executes various kinds of signal processing on image data, image processing for rearrangement and the like, and other processing on input and output signals for controlling an entire operation of the image forming apparatus 1.

The print controller 106 is a control circuit that controls the discharge operation of the recording head 6 via the head driver 140. The print controller 106 transfers data for driving the recording head 6 to the head driver 140. For example, the print controller 106 transfers image data as serial data and outputs a transfer clock, a latch signal, a control signal, and the like required for transferring the image data to the head driver 140. The head driver 140 selectively applies, based on serially-input image data corresponding to one line of the recording head 6, driving pulses forming a drive waveform received from the print controller 106 to a pressure generator of the recording head 6 for driving the recording head 6 to discharge ink. At this time, by selecting a part or all of the driving pulses forming the drive waveform or a part or all of waveform elements forming the driving pulses, dots having different sizes such as large droplets, medium droplets, or small droplets can be given separately.

The motor driver 107 is a driving circuit that controls operations of the main scanning motor 8 and the conveying motor 51. The main scanning motor 8 moves the carriage 5 in the main scanning direction under control of the motor driver 107. The conveying motor 51 rotates the conveying roller 17 to convey the recording medium P in the sub-scanning direction under control of the motor driver 107.

The I/O interface 108 is an interface circuit that receives information detected by various sensors such as the end detection sensor 20, the encoder 13, and the encoder 56.

The host I/F 109 is an interface circuit that transmits and receives data and signals to and from the host 170, which is an information processing apparatus such as a client personal computer (PC), an image reading apparatus, an imaging apparatus, or the like. Specifically, the host I/F 109 transmits and receives the data and the signals to and from the host 170 via a cable or a network. The print data stored in a reception buffer of the host I/F 109 is analyzed by the CPU 101, subjected to image processing, data rearrangement processing, and the like to be executed by the ASIC 105, and transferred to the head driver 140 as discharge data by the print controller 106.

The control panel 120 is a device for inputting and outputting various kinds of information.

Note that the configuration of the image forming apparatus 1 illustrated in FIG. 5 is an example. The image forming apparatus 1 does not necessarily include all the components illustrated in FIG. 5, or may include some other components.

Functional Configuration and Operation of Controller of Image Forming Apparatus

Figure 6:
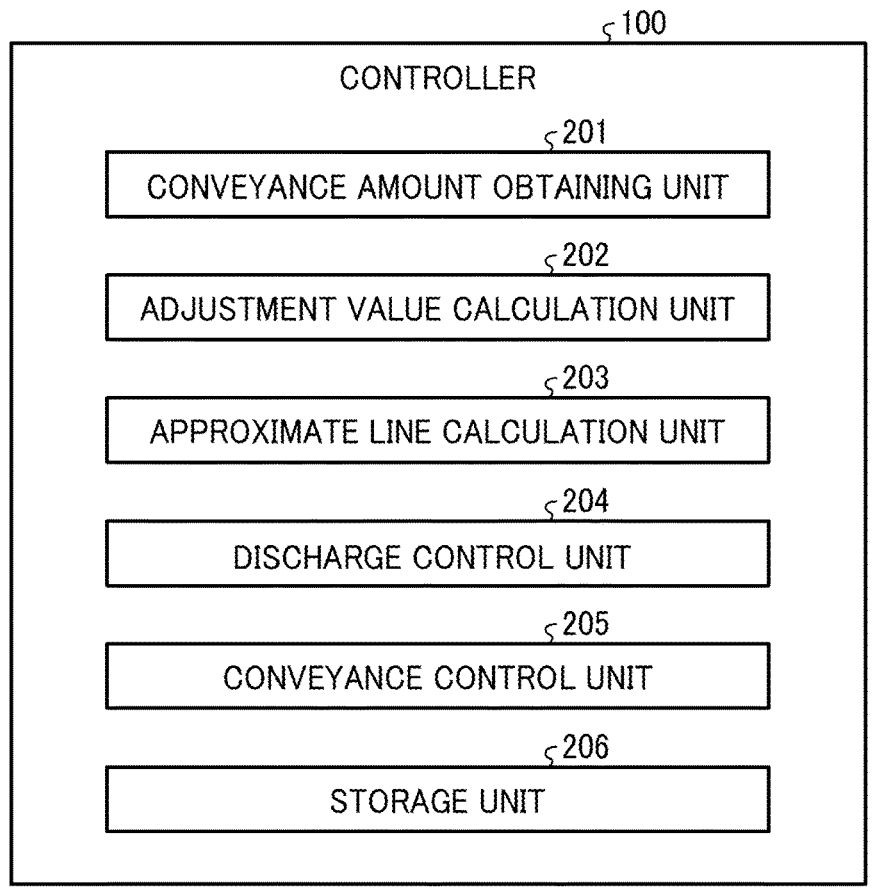
FIG. 6 is a block diagram illustrating an example of a functional configuration of a controller of the image forming apparatus according to an embodiment of the present disclosure.
Figure 7:
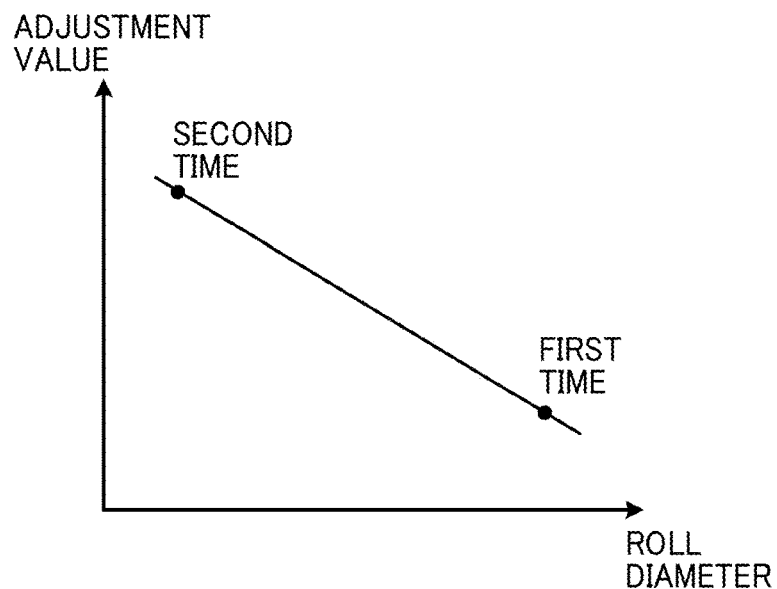
FIG. 7 is a diagram illustrating an example of an approximate line relating to adjustment values calculated based on two times of a conveying operation according to an embodiment of the present disclosure.
Figure 8:
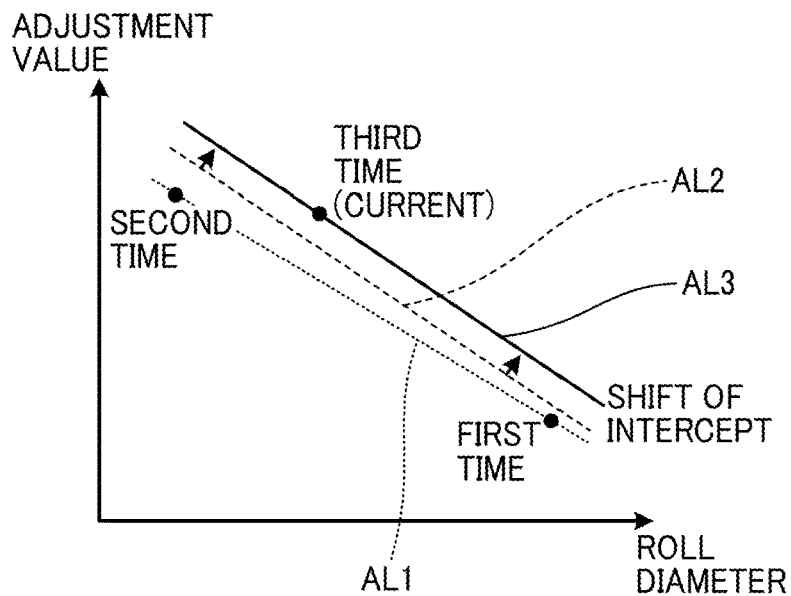
FIG. 8 is a diagram illustrating an example of an approximate line relating to adjustment values calculated based on three times of a conveying operation according to an embodiment of the present disclosure.

FIG. 6 is a block diagram illustrating an example of a functional configuration of a controller of the image forming apparatus according to the present embodiment. FIG. 7 is a diagram illustrating an example of an approximate line relating to adjustment values calculated based on two times of a conveying operation according to the present embodiment. FIG. 8 is a diagram illustrating an example of an approximate line relating to adjustment values calculated based on three times of a conveying operation according to the present embodiment. With reference to FIGS. 6 to 8, the functional configuration and operation of the controller 100 of the image forming apparatus 1 according to the present embodiment are described.

As illustrated in FIG. 6, the controller 100 of the image forming apparatus 1 includes a conveyance amount obtaining unit 201 (an obtaining unit), an adjustment value calculation unit 202 (a first calculation unit), an approximate line calculation unit 203 (a second calculation unit), a discharge control unit 204, a conveyance control unit 205 (an example of a correction unit), and a storage unit 206.

The conveyance amount obtaining unit 201 is a functional unit that obtains, from the encoder 56 via the I/O interface 108, a conveyance amount (an actual conveyance amount) of the recording medium P conveyed in the sub-scanning direction by the conveying motor 51 under control of the conveyance control unit 205. Specifically, the conveyance amount obtaining unit 201 receives the number of encoder pulses detected by the encoder 56 via the I/O interface 108 and converts the number of encoder pulses into the conveyance amount to obtain the conveyance amount. Also, the conveyance amount obtaining unit 201 obtains, for example, a conveyance amount (an actual conveyance amount) of the recording medium P intermittently conveyed in the sub-scanning direction by the conveying motor 51 under control of the conveyance control unit 205. The conveyance amount obtaining unit 201 may obtain individual conveyance amounts of the recording medium P intermittently conveyed, or may obtain an average value of individual conveyance amounts intermittently conveyed for forming one image on the recording medium P.

The adjustment value calculation unit 202 is a functional unit that calculates a difference between a target conveyance amount (an ideal conveyance amount) and the actual conveyance amount obtained by the conveyance amount obtaining unit 201, and calculates an adjustment value for the target conveyance amount based on the difference. For example, the adjustment value calculation unit 202 may calculate the difference between the target conveyance amount and the actual conveyance amount as an adjustment value, or may newly calculate an adjustment value by adding the difference to an adjustment value used for correcting the previous conveyance amount. Then, the adjustment value calculation unit 202 stores the calculated adjustment value, the diameter of the roll medium 41 at the time of conveyance of the recording medium P (corresponding to the calculated adjustment value), and the type (for example, a brand) of the recording medium P in the storage unit 206 in association with each other. Note that the type of the recording medium P is a concept of distinguishing at least one of the material, width, thickness, and the like of the recording medium P. Further, for example, in a case where only one type of the recording medium P is used in the image forming apparatus 1, the type of the recording medium P does not have to be associated with the adjustment value and the diameter of the roll medium.

The approximate line calculation unit 203 is a functional unit that refers to the storage unit 206 to calculate, for the type of the recording medium P in use, an approximate line with respect to a point (hereinafter sometimes referred to as an adjustment point) on a two-dimensional coordinate plane determined by an adjustment value calculated by the adjustment value calculation unit 202 and the diameter of the roll medium 41 corresponding to the adjustment value. In the present embodiment, the two-dimensional coordinate plane is a coordinate plane in which, for example, as illustrated in FIG. 7, the horizontal axis represents the diameter and the vertical axis represents the adjustment value. The calculation of the approximate line is synonymous with the calculation of a coefficient (inclination or intercept in case of a straight line) of a formula that defines the approximate line, for example. In FIG. 7, it is assumed that a first adjustment and a second adjustment of the conveyance amount are performed and an approximate line with respect to a first adjustment point and a second adjustment point is illustrated. In this case, the approximate line calculated by the approximate line calculation unit 203 is simply a straight line passing through the two adjustment points. A conveyance amount to be used for another conveyance can be corrected by using an adjustment value specified according to the diameter of the roll medium 41 based on the approximate line calculated as described above. Thus, a stable conveyance amount is achieved without being affected by the remaining amount of the roll medium 41.

In FIG. 8, it is assumed that the recording medium P is conveyed next time using the adjustment value obtained based on an approximate line AL1 (an approximate line illustrated in FIG. 7) with respect to the first and the second adjustment points, and that a third adjustment point is obtained. In this case, the approximate line calculation unit 203 calculates an approximate line AL2 that is a straight line using the least squares method to the first to the third adjustment points. Then, the approximate line calculation unit 203 moves the approximate line AL2 in parallel (i.e., shifts the intercept while keeping the same inclination), and updates the approximate line AL2, which is a straight line passing through the third adjustment point most recently obtained, to be an approximate line AL3 as the result of the third adjustment of the conveyance amount. The adjustment value obtained in the third adjustment is considered to be a correct value, and the inclination of the approximate line (the approximate line AL2 in the example of FIG. 8) obtained based on the adjustment values accumulated up to the previous adjustment is adopted to the approximate line AL3 as the rate of change (inclination) between the diameter and the adjustment value. The approximate line calculation unit 203 calculates and updates the approximate line in the same manner in the fourth and subsequent adjustments of the conveyance amount.

The approximate line calculation unit 203 calculates the approximate line using the least square method based on the adjustment points calculated previously and moves the approximate line in parallel to obtain the straight line passing through the adjustment point most recently obtained as the approximate line finally calculated. However, the method for obtaining the approximate line finally calculated is not limited thereto. For example, the approximate line calculated using the least squares method without being moved in parallel may be used as the approximate line finally calculated.

The discharge control unit 204 is a functional unit that controls the movement of the carriage 5 in the main scanning direction and the discharge operations of inks from the recording heads 6 by outputting dot data based on the discharge amount of each ink converted from the image data received by the host I/F 109 to the print controller 106 and the motor driver 107.

The conveyance control unit 205 is a functional unit that controls the conveying operation of the recording medium P in the sub-scanning direction by controlling the motor driver 107 based on the dot data described above. In this case, the conveyance control unit 205 conveys the recording medium P after correcting the conveyance amount. Specifically, the conveyance control unit 205 specifies an adjustment value corresponding to the diameter of the roll medium 41 at that time based on the approximate line most recently calculated by the approximate line calculation unit 203, and calculates a corrected conveyance amount by adding the adjustment value to the target conveyance amount (the ideal conveyance amount). Then, the conveyance control unit 205 outputs, to the motor driver 107, a command value for conveying the recording medium P by the corrected conveyance amount. The timing at which the conveyance control unit 205 calculates the corrected conveyance amount may be the time when the approximate line is calculated by the approximate line calculation unit 203, or the time immediately before next conveyance of the recording medium P is performed. Further, the diameter of the roll medium 41 may be obtained by being directly measured with a sensor, or may be calculated based on the total value of the actual conveyance amount conveyed by the conveying roller 17.

The storage unit 206 is a functional unit that stores, for example, data in which the adjustment value calculated by the adjustment value calculation unit 202 and the diameter of the roll medium 41 at the time of conveyance of the recording medium P are associated with each other, data of the approximate line calculated (or updated) by the approximate line calculation unit 203, and the like. The storage unit 206 is implemented by the RAM 103 or the NVRAM 104 illustrated in FIG. 5.

The conveyance amount obtaining unit 201, the adjustment value calculation unit 202, the approximate line calculation unit 203, the discharge control unit 204, and the conveyance control unit 205 described above are implemented by, for example, the CPU 101 illustrated in FIG. 5 executing programs. Note that some or all of the functional units described above may be implemented by a hardware circuit (an integrated circuit) such as a field-programmable gate array (FPGA) or an ASIC, in place of programs as software.

Further, each functional unit of the controller 100 of the image forming apparatus 1 illustrated in FIG. 6 is a conceptual representation of a function, and the functional configuration of the controller 100 is not limited thereto. For example, two or more of the functional units of the controller 100 of the image forming apparatus 1 illustrated in FIG. 6 as independent units may be integrated into a single functional unit. By contrast, a plurality of functions provided by one functional unit of the controller 100 of the image forming apparatus 1 illustrated in FIG. 6 may be divided and allocated to a plurality of functional units.

Figure 9:
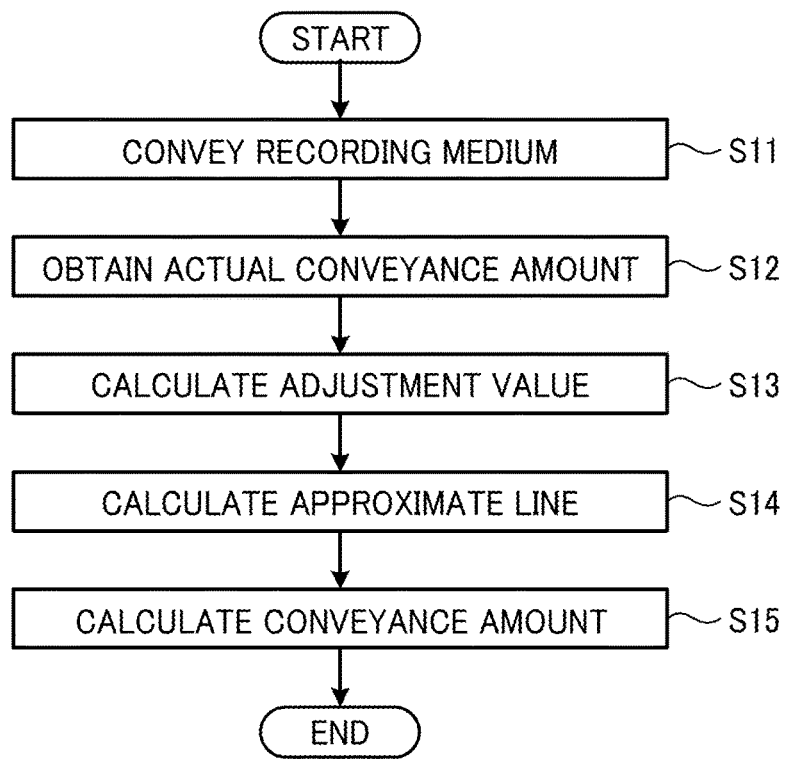
FIG. 9 is a flowchart illustrating an example of processing performed by the image forming apparatus to correct a conveyance amount of a recording medium according to an embodiment of the present disclosure.

Operation for Correcting Conveyance Amount of Recording Medium by Image Forming Apparatus FIG. 9 is a flowchart illustrating an example of processing performed by the image forming apparatus to correct a conveyance amount of a recording medium according to the present embodiment. With reference to FIG. 9, the processing performed by the image forming apparatus 1 according to the present embodiment to correct a conveyance amount of the recording medium P is described.

Step S11

The conveyance control unit 205 of the controller 100 intermittently conveys the recording medium P in the sub-scanning direction by controlling rotation of the conveying motor 51 via the motor driver 107. Then, the process proceeds to step S12.

Step S12

The conveyance amount obtaining unit 201 of the controller 100 obtains, from the encoder 56 via the I/O interface 108, a conveyance amount (an actual conveyance amount) of the recording medium P conveyed in the sub-scanning direction by the conveying motor 51 under control of the conveyance control unit 205. Then, the process proceeds to step S13.

Step S13

The adjustment value calculation unit 202 of the controller 100 calculates a difference between a target conveyance amount (an ideal conveyance amount) and the actual conveyance amount obtained by the conveyance amount obtaining unit 201, and calculates an adjustment value for the target conveyance amount based on the difference. Then, the adjustment value calculation unit 202 stores the calculated adjustment value, the diameter of the roll medium 41 at the time of conveyance of the recording medium P, and the type (for example, a brand) of the recording medium P in the storage unit 206 in association with each other. Then, the process proceeds to step S14.

Step S14

The approximate line calculation unit 203 of the controller 100 calculates, for the type of the recording medium P in use, an approximate line with respect to each point on a two-dimensional coordinate plane determined by the adjustment value calculated by the adjustment value calculation unit 202 and the diameter of the roll medium 41 corresponding to the adjustment value. Then, the process proceeds to step S15.

Step S15

The conveyance control unit 205 of the controller 100 specifies an adjustment value corresponding to the diameter of the roll medium 41 at that time based on the approximate line most recently calculated by the approximate line calculation unit 203, and calculates a corrected conveyance amount by adding the adjustment value to the target conveyance amount (the ideal conveyance amount). Then, the conveyance control unit 205 outputs, to the motor driver 107, a command value for conveying the recording medium P by the corrected conveyance amount.

Through the processing of steps S11 to S15 described above, the operation to correct the conveyance amount of the recording medium P is performed by the image forming apparatus 1.

As described above, in the image forming apparatus 1 according to the present embodiment, the sheet feed driving device 32 feeds the recording medium P from the roll medium 41, the conveying roller 17 conveys the recording medium P, the conveyance amount obtaining unit 201 obtains a plurality of actual conveyance amounts each of which is the conveyance amount of the recording medium P actually conveyed by the conveying roller 17 at a time, the adjustment value calculation unit 202 calculates an adjustment value based on a difference between an ideal conveyance amount and each of the plurality of actual conveyance amounts obtained by the conveyance amount obtaining unit 201 to obtain a plurality of adjustment values, the approximate line calculation unit 203 calculates an approximate line based on a plurality of adjustment points in a two-dimensional coordinate plane determined by the adjustment value calculated by the adjustment value calculation unit 202 and a diameter of the roll medium 41 at the time the recording medium P is conveyed by the actual conveyance amount, and the conveyance control unit 205 specifies an adjustment value corresponding to a current diameter of the roll medium 41 based on the approximate line and corrects, based on the specified adjustment value, a conveyance amount by which the conveying roller 17 conveys the recording medium P. Each of the plurality of adjustment points is determined by a diameter of the roll medium 41 at a time the recording medium P is conveyed and the adjustment value calculated from the actual conveyance amount obtained at the time the recording medium is conveyed. As a result, even when the diameter of the roll medium 41 changes, a targeted amount of conveyance is achieved.

The configuration according to the present embodiment can cope with various types (and various brands) of media and can cope with individual differences of apparatuses as compared with a conveyance amount correcting method using a correction table corresponding to a diameter. In addition, the configuration and control according to the present embodiment can be simpler compared with a configuration in which a tension bar is used to keep the back tension applied to the roll medium constant regardless of the diameter.

First Modification

Figure 10:
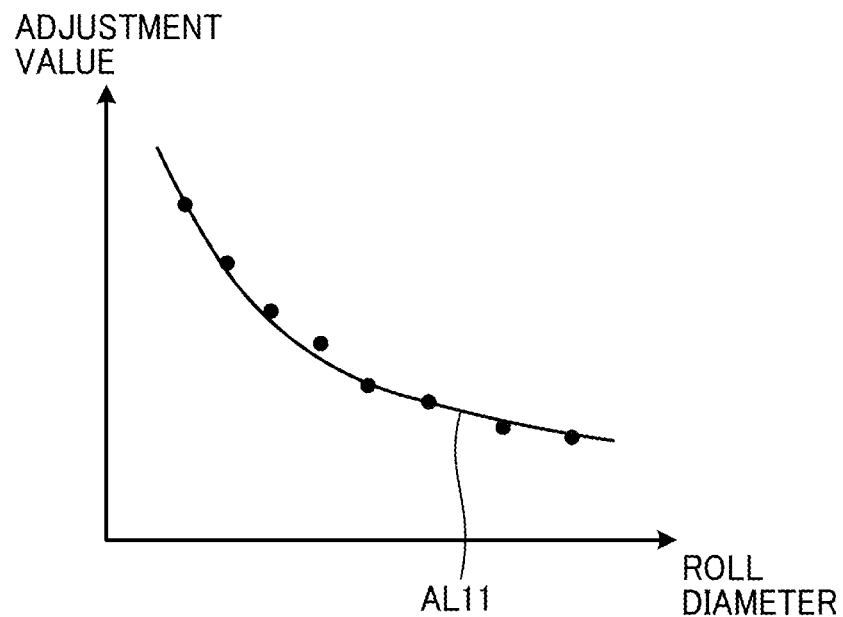
FIG. 10 is a diagram illustrating an example of an approximate curve relating to adjustment values used by an image forming apparatus according to a first modification of an embodiment of the present disclosure.

FIG. 10 is a diagram illustrating an example of an approximate curve relating to adjustment values used by an image forming apparatus according to a first modification of the present embodiment. With reference to FIG. 10, an approximate line calculated by the image forming apparatus 1 according to the present modification is described, focusing on differences from the above-described embodiment.

In the above-described embodiment, the approximate line calculated by the approximate line calculation unit 203 is an approximate straight line defined by a linear function. However, when the torque accompanying the rotation of the roll medium 41 is constant, the tension applied to the recording medium P fed from the roll medium 41 is inversely proportional to the diameter and the inertia of the roll medium 41 is proportional to the square of the diameter. Accordingly, the adjustment value for bringing the actual conveyance amount close to the ideal conveyance amount is not necessarily a straight line defined by the linear function of the diameter due to the complex factors described above. For this reason, in the present modification, a curve defined by a quadratic or higher function or a logarithmic function based on a plurality of adjustment points calculated by adjustments of the conveyance amount is used as an approximate line.

As illustrated in FIG. 10, in a case where a plurality of adjustment points is received by the approximate line calculation unit 203, the approximate line calculation unit 203 calculates an approximate line AL11 that is a curve by applying the least squares method or the like to the plurality of adjustment points.

The conveyance control unit 205 specifies an adjustment value corresponding to the diameter of the roll medium 41 at that time based on the approximate line (curve) most recently calculated by the approximate line calculation unit 203, and calculates a corrected conveyance amount by adding the adjustment value to the target conveyance amount (the ideal conveyance amount). Then, the conveyance control unit 205 outputs, to the motor driver 107, a command value for conveying the recording medium P by the corrected conveyance amount.

The operations of the other functional units of the controller 100 are substantially the same as those of the above-described embodiment.

As described above, in the case where a curve is used as an approximate line calculated based on the adjustment values in place of a straight line, the conveyance amount can be highly accurately corrected according to the diameter.

Second Modification

Figure 11:
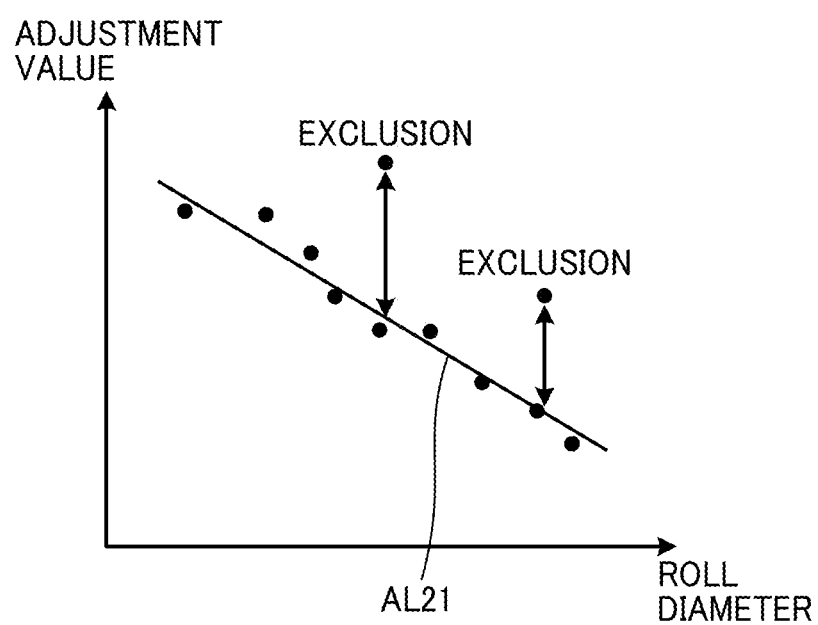
FIG. 11 is a diagram illustrating an example of an approximate line calculated with abnormal values being excluded, which is used by an image forming apparatus according to a second modification of an embodiment of the present disclosure.

FIG. 11 is a diagram illustrating an example of an approximate line calculated with abnormal values being excluded, which is used by an image forming apparatus according to a second modification of the present embodiment. With reference to FIG. 11, an approximate line calculated by the image forming apparatus 1 according to the present modification is described, focusing on differences from the above-described embodiment.

As described in the above-described embodiment, the adjustment value is calculated by the adjustment value calculation unit 202. In some cases, the adjustment value calculated by the adjustment value calculation unit 202 may indicate an abnormal value compared with the adjustment values obtained previously due to an abnormality in the conveying operation of the motor driver 107 with respect to the roll medium 41 or a failure in the conveyance medium P from the roll medium 41. In a case where the adjustment value that is the abnormal value is used for the calculation of an approximate line performed by the approximate line calculation unit 203, the adjustment value that is the abnormal value may adversely affect the accuracy of correction of the conveyance amount. For this reason, in the present embodiment, in a case where a plurality of adjustment points calculated based on the adjustments of the conveyance amount includes abnormal points calculated based on abnormal values, the approximate line is calculated with the abnormal points being excluded.

For example, as illustrated in FIG. 11, the approximate line calculation unit 203 determines adjustment values of adjustment points that are obviously separated from the positions of the other adjustment points to be abnormal values, and calculates an approximate line AL21 with respect to the other adjustment points with the adjustment points of the abnormal values being excluded.

For example, the following formula is used as a method to determine whether an adjustment value is an abnormal value. A value indicating a variation of adjustment values (for example, a standard deviation or dispersion) is assumed to be set to a. In a case where "an adjustment value>Xσ (the 'X' is a particular coefficient)" is satisfied, the adjustment value is determined to be an abnormal value.

In addition, in a case where the recording medium P is conveyed in a skew state, or in a case where the recording medium P that has been conveyed once is rewound and conveyed again, an actual conveyance amount obtained by the conveyance amount obtaining unit 201 is highly likely not to be correct. The approximate line calculation unit 203 preferably excludes the adjustment value calculated based on such an actual conveyance amount obtained by the conveyance amount obtaining unit 201 in the calculation of the approximate line as an abnormal value. In this case, the following formula is used as a method to detect a skew state. In a case where "a skew amount>Y (a particular value) mm or m" is satisfied, it is determined that the skew state has occurred. The skew amount is obtained based on the position of an end of the recording medium P detected by the end detection sensor 20. Further, referring to the operation history of the image forming apparatus 1 is an example of a method to determine whether the recording medium P that has been conveyed once and rewound is in a state of being conveyed again.

As described above, since the approximate line is calculated based on adjustment values remaining after the abnormal values are excluded from the adjustment values calculated by the approximate line calculation unit 203, the conveyance amount can be highly accurately corrected.

Third Modification

Figure 12:
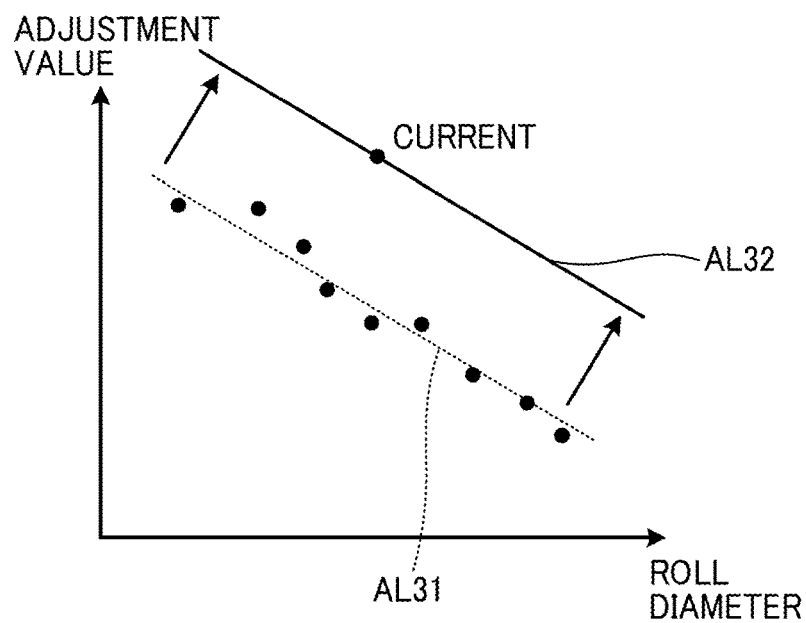
FIG. 12 is a diagram illustrating an example of an approximate line calculated with abnormal values being taken into consideration, which is used by an image forming apparatus according to a third modification of an embodiment of the present disclosure.

FIG. 12 is a diagram illustrating an example of an approximate line calculated with abnormal values being taken into consideration, which is used by an image forming apparatus according to a third modification of the present embodiment. With reference to FIG. 12, an approximate line calculated by the image forming apparatus 1 according to the present modification is described, focusing on differences from the above-described embodiment.

In the second modification described above, the approximate line is calculated based on the adjustment values remaining after the adjustment values determined to be abnormal values are excluded. In the present modification, in a case where an adjustment value most recently calculated is determined to be an abnormal value, the adjustment value most recently calculated is excluded in the calculation of the inclination of the approximate line. However, the approximate line calculated based on the adjustment values remaining after the adjustment value most recently calculated is excluded is moved in parallel so as to pass through the adjustment point of the adjustment value most recently calculated that is the abnormal value to obtain a straight line as an approximate line finally calculated.

In FIG. 12, it is assumed that the (current) adjustment value most recently calculated by the adjustment value calculation unit 202 is determined to be an abnormal value. In this case, the approximate line calculation unit 203 first calculates an approximate line AL31 that is an approximate straight line with respect to the adjustment points remaining after the adjustment point of the adjustment value that is the abnormal value is excluded. Then, the approximate line calculation unit 203 moves the approximate line AL31 in parallel (i.e., shifts the intercept while keeping the same inclination), and updates the approximate line AL31, which is a straight line passing through the adjustment point of the adjustment value most recently calculated that is the abnormal value, to be an approximate line AL32 as the result of the most recent adjustment of the conveyance amount.

Accordingly, the conveyance amount is corrected in accordance with the conveying operation at the time of adjusting the conveyance amount most recently. Thus, the conveyance amount can be highly accurately corrected.

Fourth Modification

Figure 13:
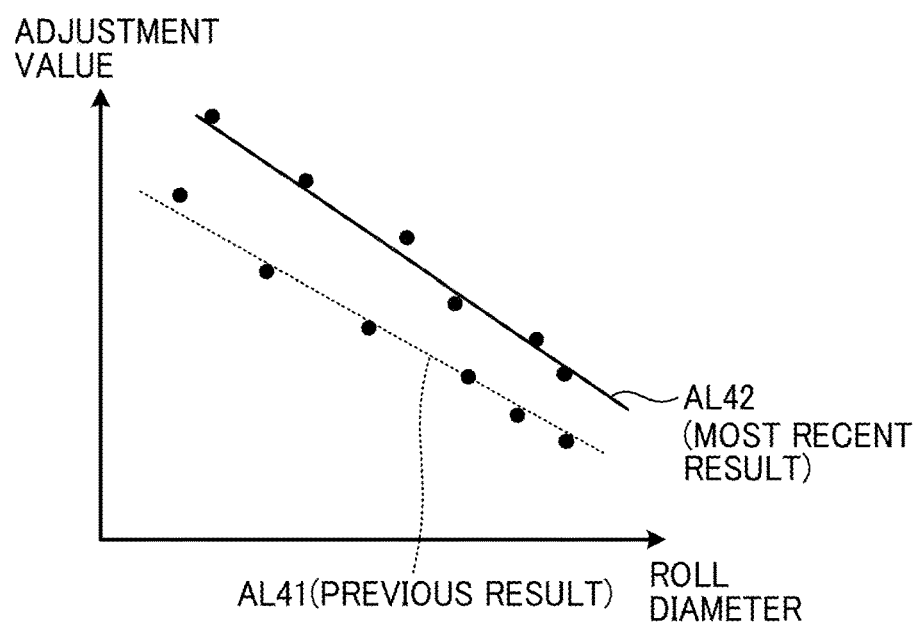
FIG. 13 is a diagram illustrating an example of an approximate line calculated with adjustment values most recently calculated being used, which is used by an image forming apparatus according to a fourth modification of an embodiment of the present disclosure.

FIG. 13 is a diagram illustrating an example of an approximate line calculated with adjustment values most recently calculated being used, which is used by an image forming apparatus according to a fourth modification of the present embodiment. With reference to FIG. 13, an approximate line calculated by the image forming apparatus 1 according to the present modification is described, focusing on differences from the above-described embodiment.

In the present modification, an operation of excluding a group of adjustment values calculated previously in a case where a gap exists between a group of adjustment values calculated recently and the group of adjustment values calculated previously due to a change of the image forming apparatus 1 over time is described.

In FIG. 13, an approximate line AL42 calculated by the approximate line calculation unit 203 with respect to the adjustment points of the most recent n (e.g., n=10) adjustment values calculated recently and an approximate line AL41 calculated by the approximate line calculation unit 203 with respect to the adjustment points of the previous n adjustment values calculated previously are illustrated. In the present embodiment, the previous n adjustment values calculated previously, for example, may not include any of the most recent n adjustment values calculated recently, or may include some former adjustment values among the most recent n adjustment values calculated recently. For example, it is assumed that 50 values are obtained as adjustment values and the "n" is 10. The most recent n (10) adjustment values calculated recently are the 41st to the 50th adjustment values, whereas the previous n (10) adjustment values calculated previously may be the 31st to the 40th adjustment values that do not overlap with the most recent n (10) adjustment values calculated recently, or the 36th to the 45th adjustment values, some of which overlap with the most recent n (10) adjustment values calculated recently.

The approximate line calculation unit 203 calculates, for example, a difference between the inclination of an approximate line with respect to the adjustment points of the previous n adjustment values calculated previously (an example of a first group of the adjustment values) and the inclination of an approximate line with respect to the adjustment points of the most recent n adjustment values calculated recently (an example of a second group of the adjustment values). In a case where "an absolute value of the difference>Z (a particular value)" is satisfied, the approximate line calculation unit 203 selects the approximate line with respect to the adjustment points of the most recent n adjustment values calculated recently as an approximate line to be finally used for correcting the conveyance amount.

As a result, even when a gap exists among the adjustment values due to a change over time caused by wear of the conveying roller 17, the pre-guide plate 16a, or the like, the conveyance amount can be highly accurately corrected by newly selecting a group of adjustment values to calculate an approximate line.

Fifth Modification

Figure 14:
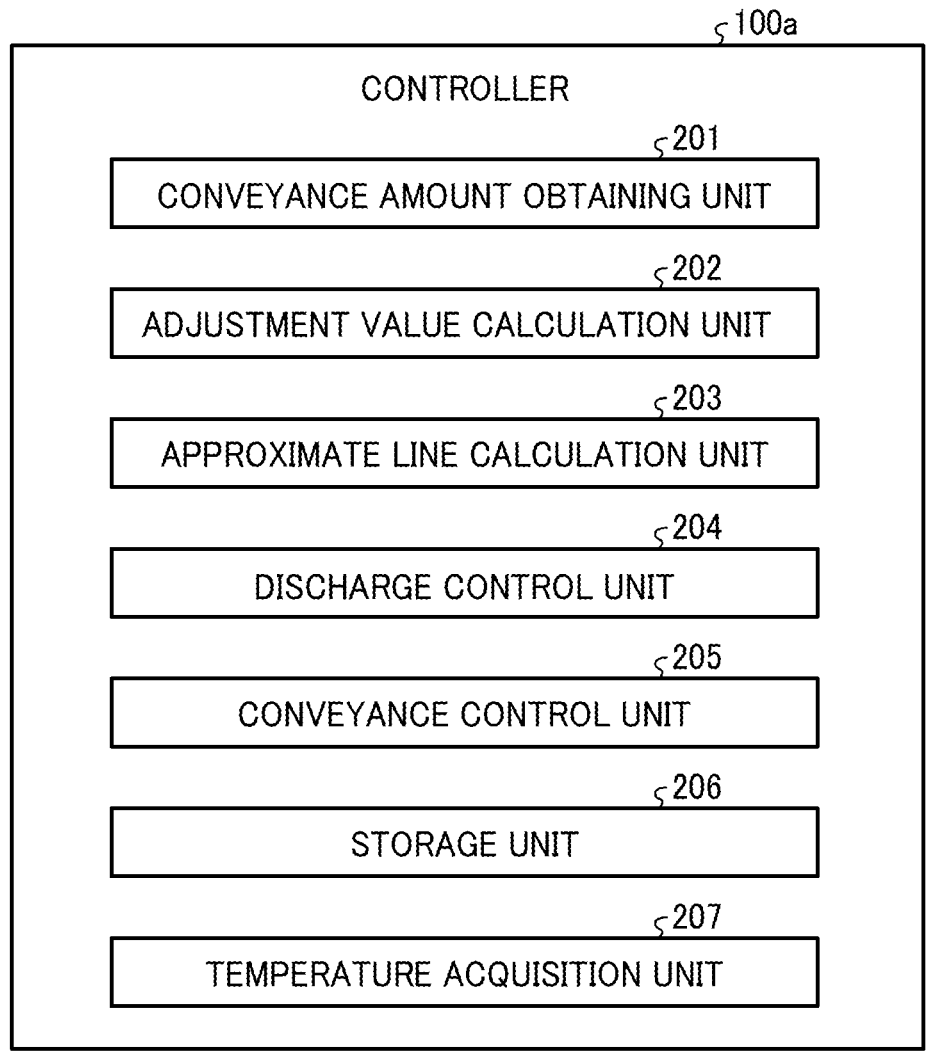
FIG. 14 is a block diagram illustrating an example of a functional configuration of a controller of an image forming apparatus according to a fifth modification of an embodiment of the present disclosure.
Figure 15:
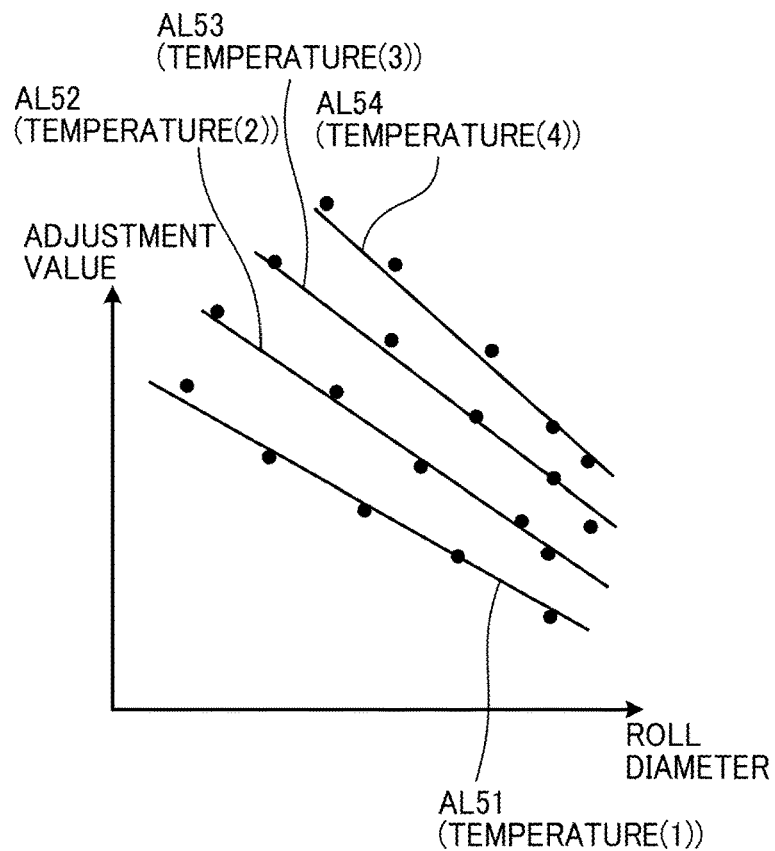
FIG. 15 is a diagram illustrating examples of approximate lines calculated in accordance with temperature, which are used by the image forming apparatus according to the fifth modification of an embodiment of the present disclosure.

FIG. 14 is a block diagram illustrating an example of a functional configuration of a controller of an image forming apparatus according to a fifth modification of the present embodiment. FIG. 15 is a diagram illustrating examples of approximate lines calculated in accordance with temperature, which are used by the image forming apparatus according to the fifth modification of the present embodiment. With reference to FIGS. 14 and 15, the image forming apparatus 1 according to the present modification is described, focusing on differences from the above-described embodiment.

The conveyance amount of the recording medium P may change depending on an environmental condition such as temperature or humidity. In such a case, adjustment values and an approximate line to be calculated may also change depending on the environmental condition. In the present modification, the operation of calculating the approximate line and correcting the conveyance amount in accordance with the environmental condition is described. The following concerns a case where the temperature is focused on as an example of the environmental condition. However, the environmental condition is not limited thereto, and may be humidity or both of temperature and humidity.

As illustrated in FIG. 14, the image forming apparatus 1 according to the present modification includes a controller 100a in place of the controller 100 of the above-described embodiment. Further, the image forming apparatus 1 includes a temperature sensor that detects the ambient temperature. The hardware configuration of the controller 100a is substantially the same as that of the controller 100 according to the above-described embodiment.

As illustrated in FIG. 14, the controller 100a of the image forming apparatus 1 includes the conveyance amount obtaining unit 201, the adjustment value calculation unit 202, the approximate line calculation unit 203, the discharge control unit 204, the conveyance control unit 205, the storage unit 206, and a temperature acquisition unit 207.

The temperature acquisition unit 207 is a functional unit that acquires the temperature detected by the temperature sensor described above via the I/O interface 108.

The adjustment value calculation unit 202 calculates a difference between a target conveyance amount (an ideal conveyance amount) and the actual conveyance amount obtained by the conveyance amount obtaining unit 201, and calculates an adjustment value for the target conveyance amount based on the difference. Then, the adjustment value calculation unit 202 stores the temperature acquired by the temperature acquisition unit 207, the calculated adjustment value, the diameter of the roll medium 41 at the time of conveyance of the recording medium P, and the type (for example, a brand) of the recording medium P in the storage unit 206 in association with each other. In the present modification, the temperature to be associated with the adjustment value, the diameter of the roll medium 41, and the type of the recording medium P may be a temperature range having a predetermined width, such as 5° C. to 15° C., 15° C. to 25° C., or 25° C. to 35° C. For example, in FIG. 15, adjustment points are distinguished for each of the four temperature ranges (temperatures (1) to (4)), and an approximate line is calculated for each of the distinguished adjustment point groups.

The approximate line calculation unit 203 calculates an approximate line for each of the temperature ranges with respect to the adjustment point group corresponding to each temperature range.

The operations of the other functional units are substantially the same as those of the above-described embodiment.

Accordingly, an adjustment value is specified based on the approximate line according to the temperature acquired by the temperature acquisition unit 207 and the conveyance amount is corrected using the adjustment value. Thus, the conveyance amount is highly accurately corrected in a state where the influence of changes in the temperature environment is reduced.

Sixth Modification

Figure 16:
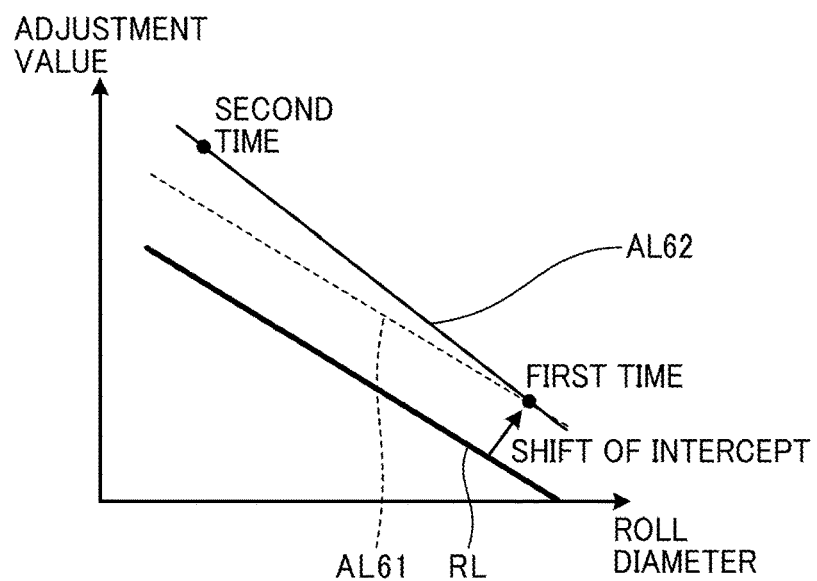
FIG. 16 is a diagram illustrating an example of a straight line representing a correction formula formed of representative values, which is used by an image forming apparatus according to a sixth modification of an embodiment of the present disclosure.

FIG. 16 is a diagram illustrating an example of a straight line representing a correction formula formed of representative values, which is used by an image forming apparatus according to a sixth modification of the present embodiment. With reference to FIG. 16, an approximate line calculated by the image forming apparatus 1 according to the present modification is described, focusing on differences from the above-described embodiment.

Before the conveyance amount is adjusted, or in a case where the conveyance amount is adjusted only once, the approximate line cannot be calculated by the approximate line calculation unit 203. In the present modification, an operation of correcting the conveyance amount in a case where there is no approximate line calculated by the approximate line calculating unit 203 is described. In such a case, an adjustment value is specified based on a straight line of a correction formula formed of representative values corresponding to the type of the recording medium P in use, and the conveyance amount is corrected using the adjustment value.

As described above, it is assumed that there is no approximate line calculated by the approximate line calculation unit 203. The conveyance control unit 205 refers to the storage unit 206 to specify an adjustment value corresponding to the diameter of the roll medium 41 at that time based on a straight line (a representative straight line RL in FIG. 16) of a correction formula formed of representative values corresponding to the type of the recording medium P in use, and adds the adjustment value to the target conveyance amount (the ideal conveyance amount) to calculate a corrected conveyance amount.

When the adjustment value is calculated once by the adjustment value calculation unit 202, as illustrated in FIG. 16, the approximate line calculation unit 203 may move the representative straight line RL in parallel (that is, shift the intercept while keeping the inclination same), and update the representative straight line RL, which is a straight line passing through the first adjustment point, to be an approximate line AL61 as the result of the first adjustment of the conveyance amount. Further, an approximate line AL62 illustrated in FIG. 16 is an approximate line calculated by the approximate line calculation unit 203 after the second adjustment of the conveyance amount is performed.

The storage unit 206 further stores data of correction formulas formed of representative values corresponding to individual types of the recording medium P.

Note that the storage unit 206 may store not only the data of the correction formulas formed of the representative values corresponding to the individual types of the recording medium P, but also data of correction formulas formed of representative values corresponding to individual widths or thicknesses of the recording medium P. In this case, the data of the correction formulas in accordance with the individual types, widths, or thickness of the recording medium P in use is selectively used.

As described above, in the case where an approximate line cannot be calculated due to an insufficient number of adjustment values, the adjustment value is specified based on the straight line of the correction formula formed of the representative values, that is, a straight line defined by a particular correction formula, and used for correcting the conveyance amount. Thus, the actual conveyance amount is prevented from greatly deviating from the ideal conveyance amount.

Aspects of the present disclosure are, for example, as follows.

In Aspect 1, a conveying device includes a sheet feeder that feeds a recording medium unreeled from a roll, a conveying roller that conveys the recording medium, an obtaining unit that obtains a plurality of actual conveyance amounts each of which is a conveyance amount of the recording medium actually conveyed by the conveying roller at a time, a first calculation unit that calculates an adjustment value based on a difference between a target conveyance amount and each of the plurality of actual conveyance amounts to obtain a plurality of adjustment values, a second calculation unit that calculates an approximate line based on a plurality of adjustment points in a two-dimensional coordinate plane determined by the adjustment value calculated by the first calculation unit and a diameter of the roll, and a correction unit that specifies an adjustment value corresponding to a current diameter of the roll based on the approximate line and corrects, based on the specified adjustment value, a conveyance amount by which the conveying roller conveys the recording medium. Each of the plurality of adjustment points is determined by a diameter of the roll at a time the recording medium is conveyed and the adjustment value calculated from the actual conveyance amount obtained at the time the recording medium is conveyed.

According to Aspect 2, in the conveying device of Aspect 1, the first calculation unit stores, in a storage unit, at least one type of the recording medium, the plurality of adjustment values, and the diameters of the roll in association with each other, and the second calculation unit refers to the storage unit and calculates the approximate line based on the adjustment point determined by the adjustment value corresponding to the type of the recording medium in use and the current diameter of the roll.

According to Aspect 3, in the conveying device of Aspect 1 or 2, the second calculation unit calculates the approximate line using adjustment values remaining after the adjustment value determined to be abnormal is excluded from the plurality of adjustment values.

According to Aspect 4, in the conveying device of Aspect 3, the second calculation unit determines, in a case where the recording medium is conveyed in a skew state, the adjustment value to be abnormal.

According to Aspect 5, in the conveying device of Aspect 3, the second calculation unit determines, in a case where the recording medium that has been conveyed once is rewound and conveyed again, the adjustment value to be abnormal.

According to Aspect 6, in the conveying device of Aspect 1 or 2, in a case where the second calculation unit determines that the adjustment value most recently calculated by the first calculation unit is abnormal, the second calculation unit calculates an approximate straight line with respect to the adjustment values remaining after the abnormal adjustment value is excluded from the plurality of adjustment values calculated by the first calculation unit, and moves the approximate straight line in parallel such that the approximate straight line passes through the adjustment point of the abnormal adjustment value, to obtain the approximate line.

According to Aspect 7, in the conveying device of any one of Aspects 1 to 6, the plurality of adjustment values includes a first group of adjustment values and a second group of adjustment values newer than the first group of adjustment values and, in a case where the second calculation unit determines that a gap exists between the approximate line calculated based on the first group of adjustment values and another approximate line calculated based on the second group of adjustment values, the second calculation unit selects the another approximate line calculated based on the second group of adjustment values as the approximate line to be used for correcting the conveyance amount performed by the correction unit.

According to Aspect 8, in the conveying device of any one of Aspects 1 to 7, the first calculation unit stores, in a storage unit, an environmental condition under which the conveying device operates, the adjustment values calculated by the first calculation unit, and the diameter of the roll in association with each other, and the second calculation unit refers to the storage unit and calculates the approximate line based on the adjustment point determined by the adjustment value corresponding to a current environmental condition under which the conveying device operates and the current diameter of the roll.

According to Aspect 9, in the conveying device of any one of Aspects 1 to 8, in a case where there is no approximate line to be used for correcting the conveyance amount, the correction unit specifies the adjustment value corresponding to the diameter of the roll based on a straight line of a correction formula formed of representative values corresponding to the type of the recording medium in use, and corrects, based on the adjustment value, the conveyance amount.

According to Aspect 10, an image forming apparatus includes the conveying device of any one of Aspects 1 to 9 and a printing device that prints an image on the recording medium.

In Aspect 11, a conveying method includes obtaining a plurality of actual conveyance amounts each of which is a conveyance amount of a recording medium actually conveyed by a conveying roller at a time, calculating an adjustment value based on a difference between a target conveyance amount and each of the plurality of actual conveyance amounts to obtain a plurality of adjustment values, calculating an approximate line based on a plurality of adjustment points in a two-dimensional coordinate plane determined by the adjustment value and a diameter of the roll, specifying an adjustment value corresponding to a current diameter of the roll based on the approximate line, and correcting, based on the specified adjustment value, a conveyance amount by which the conveying roller conveys the recording medium. Each of the plurality of adjustment points is determined by a diameter of the roll at a time the recording medium is conveyed and the adjustment value calculated from the actual conveyance amount obtained at the time the recording medium is conveyed.

In Aspect 12, a non-transitory recording medium carrying computer readable codes for controlling a computer system to perform a method. The method includes obtaining a plurality of actual conveyance amounts each of which is a conveyance amount of a recording medium actually conveyed by a conveying roller at a time, calculating an adjustment value based on a difference between a target conveyance amount and each of the plurality of actual conveyance amounts to obtain a plurality of adjustment values, calculating an approximate line based on a plurality of adjustment points in a two-dimensional coordinate plane determined by the adjustment value and a diameter of the roll, specifying an adjustment value corresponding to a current diameter of the roll based on the approximate line, and correcting, based on the specified adjustment value, a conveyance amount by which the conveying roller conveys the recording medium. Each of the plurality of adjustment points is determined by a diameter of the roll at a time the recording medium is conveyed and the adjustment value calculated from the actual conveyance amount obtained at the time the recording medium is conveyed.

Note that, in a case where at least a portion of the functional units of the image forming apparatus 1 according to the above-described embodiment and modifications is implemented by execution of a computer program, the program can be prestored in a ROM or the like. The program to be executed by the image forming apparatus 1 according to the above-described embodiment and modifications may be configured to be recorded in any computer-readable recording medium, such as a compact disc read only memory (CD-ROM), a flexible disk (FD), a compact disc recordable (CD-R), or a digital versatile disc (DVD), in an installable or executable file format and provided as a computer program product. Alternatively, the program to be executed by the image forming apparatus 1 according to the above-described embodiment and modifications may be configured to be stored in a computer connected to a network such as the Internet and provided by being downloaded via the network. Further, the program to be executed by the image forming apparatus 1 according to the above-described embodiment and modifications may be configured to be provided or distributed via a network such as the Internet. The program to be executed by the image forming apparatus 1 according to the above-described embodiment and modifications has a module structure including at least one of the above-described functional units. As actual hardware, the CPU reads the program from the above-described ROM and executes the program to load the above-described functional units onto a main storage device and generate the functional units on the main storage device.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carries out or is programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A conveying device comprising:
   a sheet feeder configured to feed a recording medium unreeled from a roll;
   a conveying roller configured to convey the recording medium; and
   circuitry configured to:
     obtain a plurality of actual conveyance amounts each being a conveyance amount of the recording medium actually conveyed by the conveying roller at a time;
     calculate an adjustment value based on a difference between a target conveyance amount and each of the plurality of actual conveyance amounts to obtain a plurality of adjustment values;
     calculate an approximate line based on a plurality of adjustment points in a two-dimensional coordinate plane determined by the adjustment value and a diameter of the roll, each of the plurality of adjustment points being determined by a diameter of the roll at a time the recording medium is conveyed and the adjustment value calculated from the actual conveyance amount obtained at the time the recording medium is conveyed;
     specify an adjustment value corresponding to a current diameter of the roll based on the approximate line; and
     correct, based on the specified adjustment value, a conveyance amount by which the conveying roller conveys the recording medium.

2. The conveying device according to claim 1, wherein the circuitry is further configured to:
   store, in a memory, at least one type of the recording medium, the plurality of adjustment values, and the diameters of the roll in association with each other; and
   refer to the memory and calculate the approximate line based on the adjustment point determined by the adjustment value corresponding to the type of the recording medium in use and the current diameter of the roll.

3. The conveying device according to claim 1, wherein the circuitry is configured to calculate the approximate line using adjustment values remaining after the adjustment value determined to be abnormal is excluded from the plurality of adjustment values.

4. The conveying device according to claim 3, wherein the circuitry is further configured to, in a case where the recording medium is conveyed in a skew state, determine the adjustment value to be abnormal.

5. The conveying device according to claim 3, wherein the circuitry is configured to, in a case where the recording medium that has been conveyed once is rewound and conveyed again, determine the adjustment value to be abnormal.

6. The conveying device according to claim 1, wherein the circuitry is configured to, in a case where the adjustment value most recently calculated is determined to be abnormal, calculate an approximate straight line with respect to the adjustment values remaining after the abnormal adjustment value is excluded from the plurality of adjustment values, and move the approximate straight line in parallel such that the approximate straight line passes through the adjustment point of the abnormal adjustment value, to obtain the approximate line.

7. The conveying device according to claim 1, wherein:
the plurality of adjustment values includes a first group of adjustment values and a second group of adjustment values newer than the first group of adjustment values; and
the circuitry is configured to, in a case where a gap is determined to exist between the approximate line calculated based on the first group of adjustment values and another approximate line calculated based on the second group of adjustment values, select the another approximate line as the approximate line to be used for correcting the conveyance amount.

8. The conveying device according to claim 1, wherein the circuitry is further configured to:
store, in a memory, an environmental condition under which the conveying device operates, the adjustment values, and the diameters of the roll in association with each other; and
refer to the memory and calculate the approximate line based on the adjustment point determined by the adjustment value corresponding to a current environmental condition under which the conveying device operates and the current diameter of the roll.

9. The conveying device according to claim 1, wherein the circuitry is configured to, in a case where there is no approximate line to be used for correcting the conveyance amount, specify the adjustment value corresponding to the diameter of the roll based on a straight line of a correction formula formed of representative values corresponding to the type of the recording medium in use, and correct, based on the adjustment value, the conveyance amount.

10. An image forming apparatus comprising the conveying device according to claim 1 and a printing device configured to print an image on the recording medium.

11. A conveying method comprising:
obtaining a plurality of actual conveyance amounts each being a conveyance amount of a recording medium actually conveyed by a conveying roller at a time;
calculating an adjustment value based on a difference between a target conveyance amount and each of the plurality of actual conveyance amounts to obtain a plurality of adjustment values;
calculating an approximate line based on a plurality of adjustment points in a two-dimensional coordinate plane determined by the adjustment value and a diameter of the roll, each of the plurality of adjustment points being determined by a diameter of the roll at a time the recording medium is conveyed and the adjustment value calculated from the actual conveyance amount obtained at the time the recording medium is conveyed;
specifying an adjustment value corresponding to a current diameter of the roll based on the approximate line; and
correcting, based on the specified adjustment value, a conveyance amount by which the conveying roller conveys the recording medium.

12. A non-transitory recording medium carrying computer readable codes for controlling a computer system to perform a method, the method comprising:
obtaining a plurality of actual conveyance amounts each being a conveyance amount of a recording medium actually conveyed by a conveying roller at a time;
calculating an adjustment value based on a difference between a target conveyance amount and each of the plurality of actual conveyance amounts to obtain a plurality of adjustment values;
calculating an approximate line based on a plurality of adjustment points in a two-dimensional coordinate plane determined by the adjustment value and a diameter of the roll, each of the plurality of adjustment points being determined by a diameter of the roll at a time the recording medium is conveyed and the adjustment value calculated from the actual conveyance amount obtained at the time the recording medium is conveyed;
specifying an adjustment value corresponding to a current diameter of the roll based on the approximate line; and
correcting, based on the specified adjustment value, a conveyance amount by which the conveying roller conveys the recording medium.

* * * * *